(12) United States Patent
Zocher et al.

(10) Patent No.: US 9,499,043 B2
(45) Date of Patent: Nov. 22, 2016

(54) AIR INTAKE ASSEMBLY FOR A VEHICLE

(71) Applicant: SHEM, LLC, Hagerstown, IN (US)

(72) Inventors: Walter Zocher, Bellville (ZA); Calvyn Wilbur Mouton, Brackenfell (ZA)

(73) Assignee: Shem, LLC, Hagerstown, IN (US)

( * ) Notice: Subject to any disclaimer, the term of this patent is extended or adjusted under 35 U.S.C. 154(b) by 0 days.

(21) Appl. No.: 14/670,084

(22) Filed: Mar. 26, 2015

(65) Prior Publication Data

US 2015/0275828 A1    Oct. 1, 2015

Related U.S. Application Data

(60) Provisional application No. 61/970,650, filed on Mar. 26, 2014.

(51) Int. Cl.
| | |
|---|---|
| *B60K 13/00* | (2006.01) |
| *B60K 13/02* | (2006.01) |
| *F01N 5/02* | (2006.01) |
| *F02M 35/10* | (2006.01) |
| *F02M 35/16* | (2006.01) |
| *F02M 31/08* | (2006.01) |
| *F02M 31/087* | (2006.01) |
| *F02M 31/093* | (2006.01) |

(52) U.S. Cl.
CPC .............. *B60K 13/02* (2013.01); *F01N 5/02* (2013.01); *F02M 31/08* (2013.01); *F02M 31/087* (2013.01); *F02M 31/093* (2013.01); *F02M 35/10013* (2013.01); *F02M 35/10268* (2013.01); *F02M 35/164* (2013.01); *B60Y 2200/144* (2013.01); *Y02T 10/126* (2013.01)

(58) Field of Classification Search
CPC .............................. B60K 13/00; B60K 13/02
See application file for complete search history.

(56) References Cited

U.S. PATENT DOCUMENTS

| | | | | |
|---|---|---|---|---|
| 4,295,454 A | * | 10/1981 | Iida .......................... | F02M 7/28 123/552 |
| 2007/0197157 A1 | * | 8/2007 | Bellinger ............ | F02B 29/0418 454/155 |

* cited by examiner

*Primary Examiner* — Bryan Evans
(74) *Attorney, Agent, or Firm* — Banner & Witcoff, Ltd.

(57) ABSTRACT

An air intake assembly for a vehicle includes an air intake configured to intake ambient air and a heater box configured to be positioned adjacent a component of an exhaust assembly of the vehicle. The heater box is configured to intake ambient air and heat the air by heat absorption from the component of the exhaust assembly. The air intake assembly is configured to selectively permit passage of ambient air from the air intake and heated air from the heater box toward the engine assembly. The air intake assembly may selectively permit passage of ambient air and heated air by use of a valve in communication with the air intake and the heater box and further in connection with an engine assembly of the vehicle, the valve configured to selectively permit passage of ambient air from the air intake and heated air from the heater box toward the engine assembly.

23 Claims, 13 Drawing Sheets

AIR INTAKE ASSEMBLY FOR A VEHICLE

CROSS-REFERENCE TO RELATED APPLICATION

This application is a non-provisional of, and claims priority to, copending U.S. Provisional Application No. 61/970,650, filed Mar. 26, 2014, which application is incorporated by reference herein in its entirety and made part hereof.

TECHNICAL FIELD

The present invention generally relates to air intake assemblies for a vehicle engine, and more particularly, to an air intake assembly for an engine that warms air flowing through the assembly prior to reaching the engine.

BACKGROUND

Compressed natural gas (CNG) is becoming more widely used for powering various different types of vehicles, due at least in part to the fact that CNG is a relatively economical, efficient, and environmentally favorable source of energy. Many types of vehicles, including refuse trucks and other fleet-type vehicles, have increasingly been outfitted with engines and fuel systems configured for CNG. However, in certain low ambient temperature (i.e., cold weather) vehicle applications, low temperature engine induction air at the intake can result in icing of the intake throttle, as well as potentially other components. Icing of the intake throttle can have a negative impact on throttle body performance and overall engine performance. Other types of engines, such as gasoline or diesel engines, may experience icing of certain components under cold weather conditions as well.

Thus, while certain vehicles and air intake assemblies for such vehicles according to existing designs provide a number of advantageous features, they nevertheless have certain limitations. The present invention seeks to overcome certain of these limitations and other drawbacks of the prior art, and to provide new features not heretofore available.

BRIEF SUMMARY

The following presents a general summary of aspects of the invention in order to provide a basic understanding of the invention. This summary is not an extensive overview of the invention. It is not intended to identify key or critical elements of the invention or to delineate the scope of the invention. The following summary merely presents some concepts of the invention in a general form as a prelude to the more detailed description provided below.

Aspects of the present disclosure relate to an air intake assembly for a vehicle, including an air intake configured to intake ambient air and a heater box configured to be positioned adjacent a component of an exhaust assembly of the vehicle. The heater box is configured to intake ambient air and heat the air by heat absorption from the component of the exhaust assembly. The air intake assembly is configured to selectively permit passage of ambient air from the air intake and heated air from the heater box toward the engine assembly. The air intake assembly may selectively permit passage of ambient air and heated air by use of a valve in communication with the air intake and the heater box and further in connection with an engine assembly of the vehicle, the valve configured to selectively permit passage of ambient air from the air intake and heated air from the heater box toward the engine assembly. The assembly may also include an extraction conduit that connects the heater box to the valve. The heater box may have a rectangular shape in one embodiment, but may have a different shape in another embodiment.

According to one aspect, the heater box defines a chamber, and wherein the heater box is configured to be positioned such that a portion of the component of the exhaust assembly is positioned within the chamber to permit heat transfer from the component of the exhaust assembly to the air within the chamber. For example, the component of the exhaust assembly may be a catalyst device, and the chamber may be disposed around the catalyst device.

According to another aspect, the intake assembly further includes a valve control connected to the valve and configured to control operation of the valve. For example, the valve control may be a manually-operated device in one embodiment, or may be a computer-operated device in another embodiment. As another example, the valve and/or the valve control may be configured to allow mixing of ambient air from the air intake and heated air from the heater box in one embodiment, or may be configured for alternate selection of passing ambient air from the air intake or passing heated air from the heater box in another embodiment.

According to a further aspect, the intake assembly may also include an intake conduit configured for connection to an air cleaner, where the valve is positioned between the air intake and the intake conduit.

According to yet another aspect, the heater box has a bottom end adapted to receive ambient air and a top end adapted to allow air to exit the heater box.

Additional aspects of the disclosure relate to an air intake assembly for a vehicle, including a cooler conduit configured to be connected to a charge air cooler of the vehicle, a bypass conduit joined to the cooler conduit, the bypass conduit being configured to bypass the charge air cooler, and a heat exchanger connected to the bypass conduit and being configured to heat air passing therethrough. The heat exchanger is further connected to a coolant system of the vehicle and is configured to heat passing air by heat absorption from the coolant system. The cooler conduit has a first valve, and the bypass conduit has a second valve. The assembly further includes an engine conduit connected to the heat exchanger and configured to pass heated air from the heat exchanger to an engine of the vehicle.

According to one aspect, the first valve and the second valve are configured to incrementally adjust the flow rates through the cooler conduit and the bypass conduit to achieve a selected flow ratio between heated air from the heat exchanger and non-heated air from the charge air cooler.

According to another aspect, the intake assembly further includes a turbocharger conduit configured for connection to a turbocharger of the vehicle. The turbocharger conduit has a split joint joining the turbocharger conduit to the cooler conduit and the bypass conduit.

Further aspects of the disclosure relate to an air intake assembly that includes a combination of the features described herein, such as a combination of the heater box and associated components and the heat exchanger and associated components.

Still further aspects of the disclosure relate to a vehicle that includes an air intake assembly as described above, or a combination of such intake assemblies. The vehicle may include a chassis supported by a plurality of wheels, an engine assembly operably connected to at least one of the wheels and configured to transfer power to the at least one of the wheels, an exhaust assembly connected to the engine assembly, and an air intake assembly connected to the engine assembly and configured for supplying air to the engine assembly. The air intake assembly may be structured and configured according to any of the aspects and embodiments described herein.

According to one aspect, the vehicle also includes an air cleaner connected to the engine assembly and configured to clean the air from the air intake assembly before the air reaches the engine assembly, wherein the air intake assembly further includes an intake conduit configured for connection to an air cleaner, and wherein the valve is positioned between the air intake and the intake conduit.

Other features and advantages of the invention will be apparent from the following description taken in conjunction with the attached drawings.

BRIEF DESCRIPTION OF THE DRAWINGS

To understand the present invention, it will now be described by way of example, with reference to the accompanying drawings in which.

Figure 1:
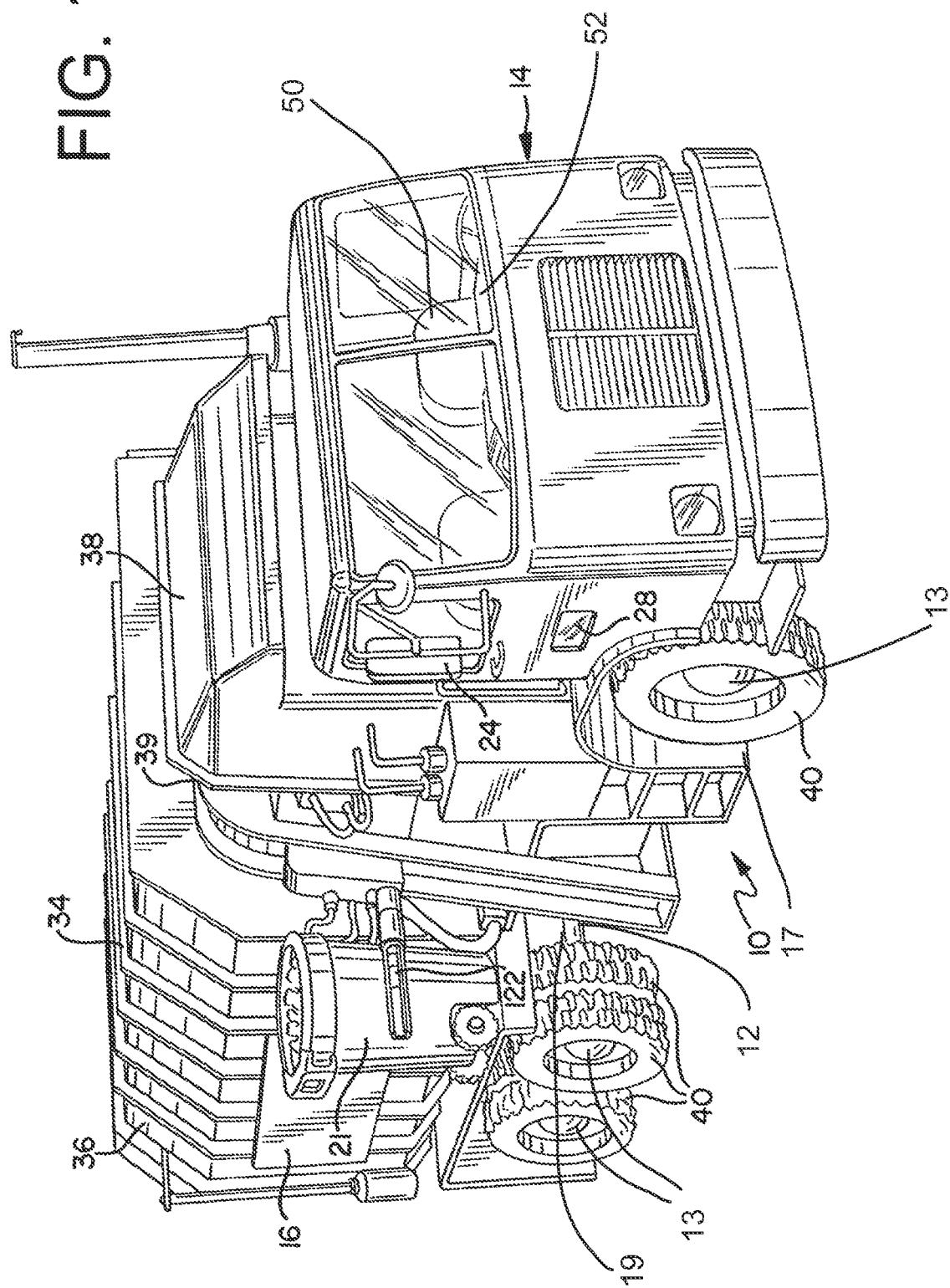
FIG. 1 is a perspective view of a vehicle in the form of a refuse truck.

It is understood that certain components may be removed from the drawing figures in order to provide better views of internal components.

DETAILED DESCRIPTION

While this invention is susceptible of embodiment in many different forms, there are shown in the drawings, and will herein be described in detail, preferred embodiments of the invention with the understanding that the present disclosure is to be considered as an exemplification of the principles of the invention and is not intended to limit the broad aspect of the invention to the embodiments illustrated.

Referring now in detail to the Figures, FIG. 1 illustrates an example of a vehicle that can be used in connection with aspects of the present disclosure, generally designated with the reference numeral 10. In one embodiment, the vehicle 10 is in the form of a refuse hauling truck. It is understood that aspects and features of the present invention can be incorporated into various types of vehicles including other heavy-duty vehicles, medium-duty vehicles or light-weight vehicles of various applications.

Figure 2:
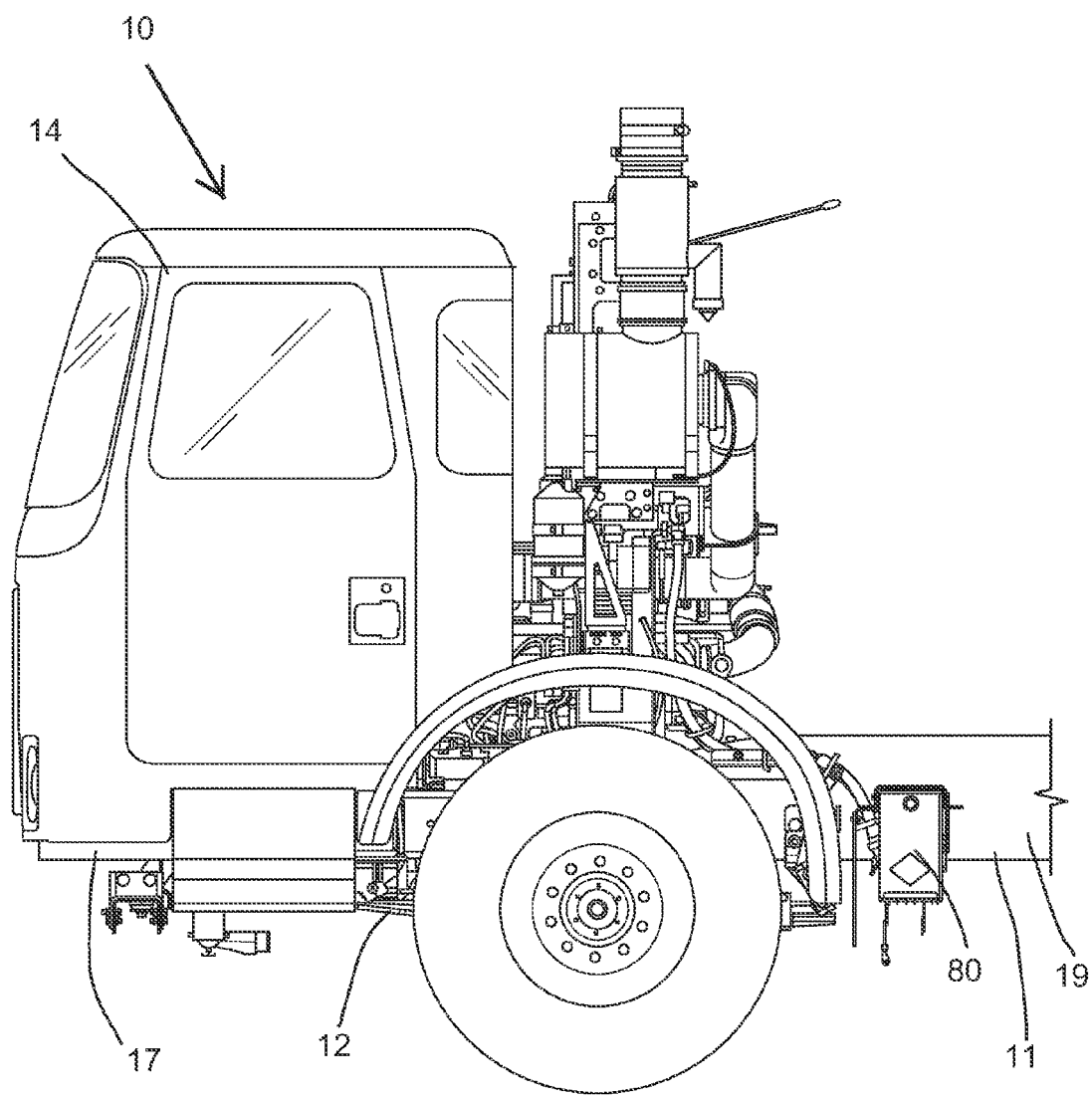
FIG. 2 is a side perspective view of a portion of a vehicle in the form of a refuse truck.
Figure 6:
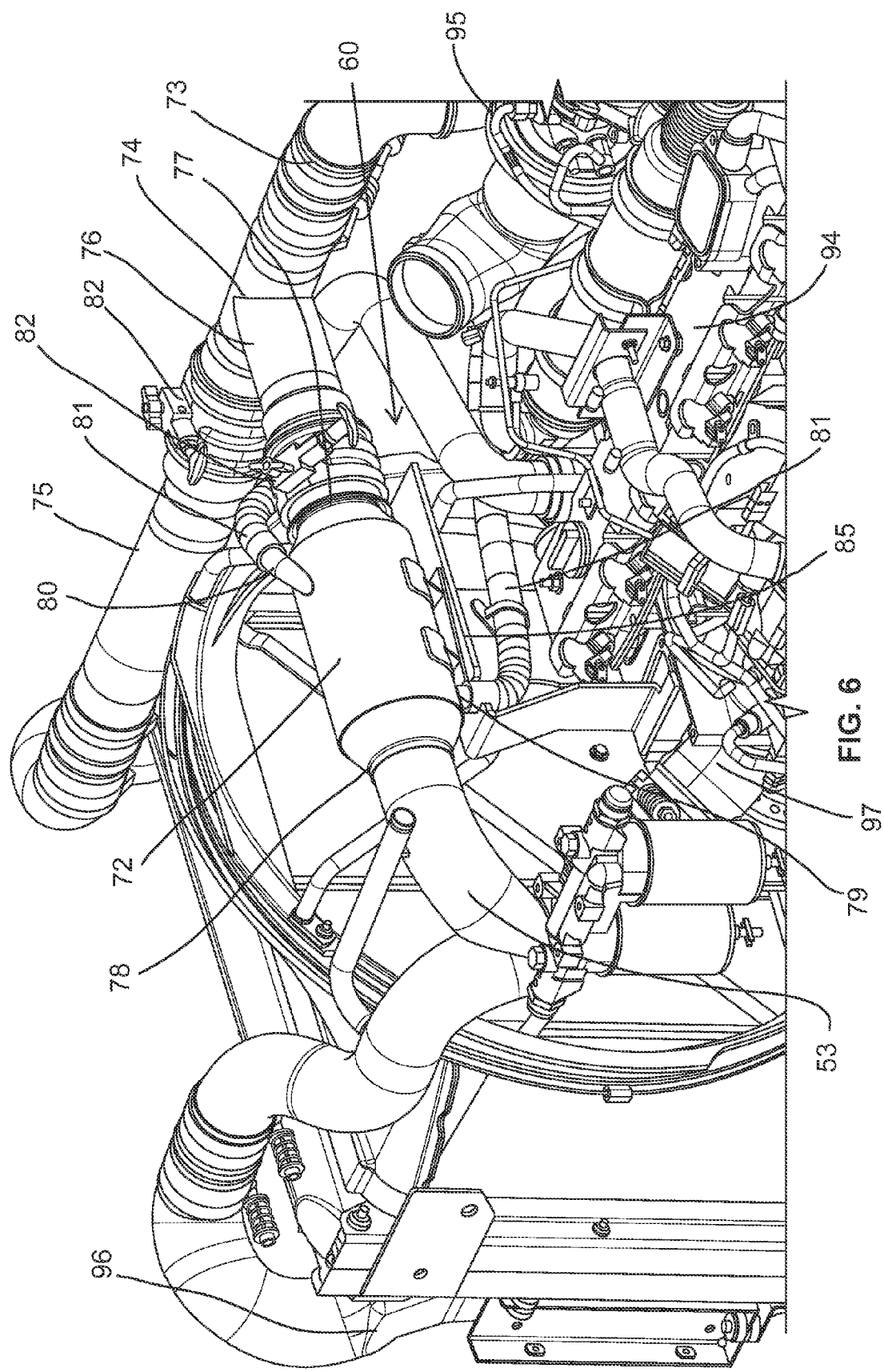
FIG. 6 is a rear perspective view of a portion of an engine assembly of a vehicle as shown in FIG. 2, including another embodiment of an air intake assembly according to aspects of the present disclosure.
Figure 7:
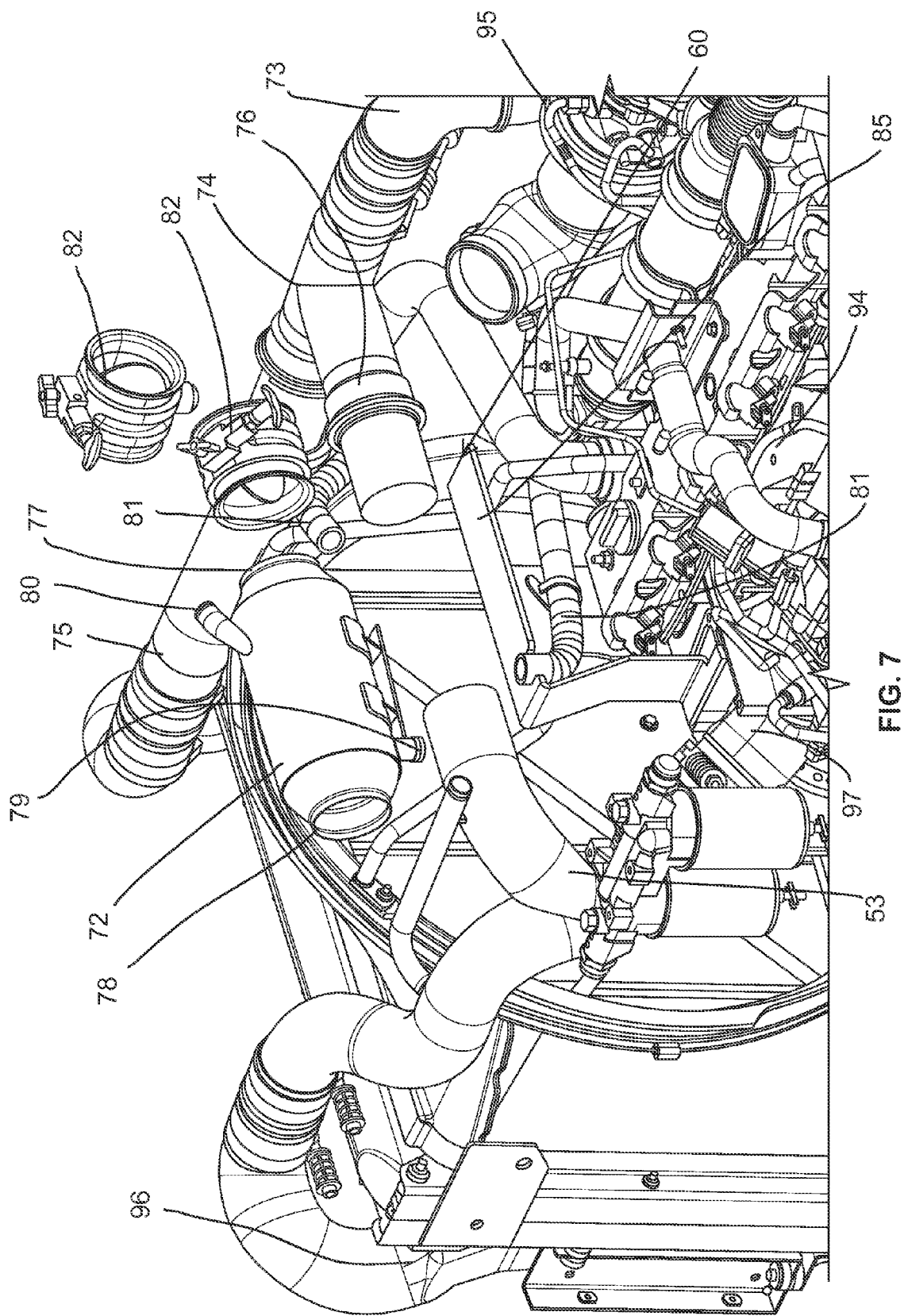
FIG. 7 is a partially exploded rear perspective view of the engine assembly and air intake assembly of FIG. 6.

FIGS. 1-2 illustrate features of the vehicle 10. The vehicle 10 generally includes a chassis 12 supporting an operator cab 14 and a vehicle body 16. When assembled, the body 16 and the operator cab 14 are mounted on the chassis 12. The chassis 12 is a truck chassis and may have frame members or rail members 11, and the chassis 12 has a front portion 17 for supporting the operator cab 14 and a rear portion 19 for supporting the body 16. The exterior of the operator cab 14 may include doors 28, mirrors 24, and other such structures. In one embodiment, the rail members 11 are made from steel and are generally rectangular in cross-section (e.g., C-section). The rail members 11 may extend substantially the entire length of the chassis 12 in one embodiment, and may serve as points of support and/or connection for the body 16, the cab 14, the axles 13, and other components. As is known in the art, the chassis 12 has a front axle 13 and one or more rear axles 13 which in turn are attached to wheels 40 for movement of the chassis 12 along a surface. Additionally, as shown in FIGS. 6-7, the vehicle 10 has a drivetrain that includes an engine 94 connected to a transmission (not shown) configured to transfer power to at least one of the wheels 40. The transmission may be connected to one or both front wheels 40 in one embodiment, but it is understood that the transmission may be connected to transfer power directly to any number of the wheels 40, including, additionally or alternately, one or more of the back wheels 40 in some embodiments. It is understood that the transmission may allow shifting between several settings (e.g. D, N, R) and several gears (e.g. various forward-drive gear ratios). The engine 94 may be a CNG engine in one embodiment, and may be part of an engine assembly that also includes components such as a turbocharger 95, various airflow conduits, coolant lines 81, etc. The vehicle 10 may include additional components connected to the engine 94 and/or engine assembly as well, including an air cleaner assembly 46 and an exhaust assembly 48 that may include an exhaust pipe 45, a three-way catalyst device 47, etc. (See FIGS. 3-4). In another embodiment, the engine 94 may be configured as a different type, such as a gasoline or diesel engine. In these embodiments, the vehicle may contain at least some components as described herein, such as various airflow conduits, coolant lines 81, etc., as well as additional components.

The chassis 12 may receive several different configurations of the body 16, having various functionalities. As illustrated in FIG. 1, in an exemplary embodiment for a refuse truck, the body 16 includes a storage area 34, a loading area 36, a reception area 38, an open hopper 39 and a moveable arm 122. Refuse 21 may be loaded in the reception area 38 by use of the arm 122. Refuse is stored in the storage area 34 and generally compacted within the body 16. However, as understood by those of skill in the art, other bodies for different purposes such as front loaders, rear loaders, dump trucks, straight trucks, cement trucks, pumpers, sweepers and other applications may be used in connection with the present invention. Numerous components of the body 16 are capable of being adjusted, manipulated or otherwise actuated such as lifting the axles, manipulating the arm 122, opening the hopper 39, and compacting.

Figure 1A:
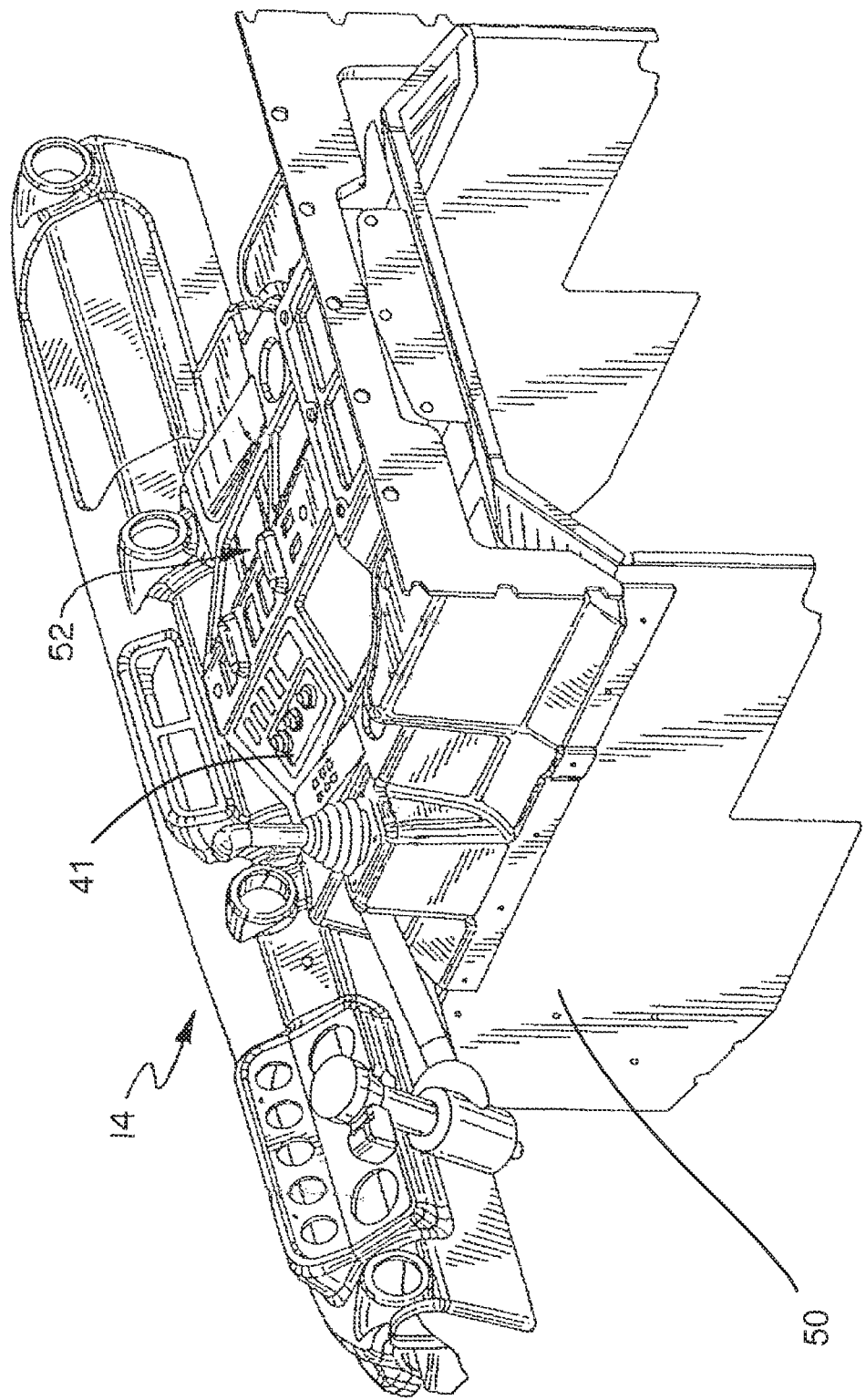
FIG. 1A is a perspective view of an interior of an operator cab of the vehicle of FIG. 1.

One embodiment of the interior of an operator cab 14 is shown in FIG. 1A. The operator cab 14 generally includes an operator and/or passenger area 50, and in one embodiment, the vehicle 10 may be operable in a left or right hand drive configuration and may be switchable between such configurations. The operator cab 14 may also contain a dashboard 52 that includes controls for operating and monitoring the vehicle 10. As shown in FIG. 1A, the cab 14 may include one or more controls 41 that may include various switches, controls, meters, displays, etc., including for example an ignition switch, a speedometer and/or other monitors, and a transmission control (e.g. a stick or a push-button control), which may be located in the dashboard 52. The controls 41 may also include actuators for a main or service braking system, which may be air brakes in one embodiment, a parking brake system, or a throttle (e.g., an accelerator), as well as controls for lifting the axles, manipulating the arm 122, opening the hopper 39, compacting, etc.

A vehicle such as the refuse truck 10 illustrated in FIGS. 1-1A may include a vehicle control system (not shown) configured for controlling one or more operating parameters of the vehicle 10, including one or more operating parameters of the cab 14, the body 16, the drivetrain, etc. The vehicle control system may also be configured for monitoring and/or displaying various parameters related to the operation of the vehicle 10. The vehicle control system may include necessary electronic hardware and software to perform its functions, including a processor, memory (including RAM, ROM, digital storage, etc.), and an external connection (wired and/or wireless) for connecting to other components of the vehicle 10 and sending/receiving data and instructions to and from such other components. Additionally, the vehicle control system may control components of the vehicle directly, such as by sending electronic instructions, or indirectly, such as by instructing an intermediate component to take actions, such as a hydraulic or pneumatic system. At least some of the controls 41 in the operator cab may be integrated into and/or connected to the vehicle control system, to enable monitoring, controlling, and/or interacting with the vehicle control system.

FIG. 2 illustrates a vehicle 10 similar to the vehicle illustrated in FIGS. 1-1A, outfitted with a CNG fuel system. Such a fuel system may also be connected to the vehicle control system for monitoring and/or control purposes. The fuel system may contain several components, including one or more fuel tanks, conduits connecting the fuel tanks to other components (e.g., the engine 94), a fuel filter, and a fuel management module 80, as well as various brackets and mountings for supporting components of the fuel system. The fuel management module 80 may be configured as a central point for management of the fuel within the fuel system, including filling and defueling the tank(s) and transferring fuel from the tank(s) to the engine 94. The fuel management module 80 may further be connected to the vehicle control system, and may receive inputs from and/or send outputs to the vehicle control system.

The vehicle 10 may also include an air intake assembly 60 that includes a number of conduits that intake air and provide a flow path for the air to reach the engine 94. The air intake assembly also includes the air cleaner 46. FIGS. 3-12 illustrate various embodiments of air intake assemblies 60 according to aspects described herein. The conduits of the air intake assembly 60 generally include a first or intake conduit 61 that intakes ambient air and passes the air to the air cleaner 46 and a second conduit 62 that is connected from the air cleaner 46 to the engine assembly. The intake conduit 61 may be connected to an air intake 63, which may have a flared, forward-facing opening as in FIGS. 1-3. The intake 63 may have a different form in other embodiments, including a simple opening. In one embodiment, the conduit 62 passes air directly from the air cleaner 46 to the turbocharger 95. Additional conduits may be included in the air intake assembly 60, including additional conduits within and around the engine assembly, as described herein.

Figure 3:
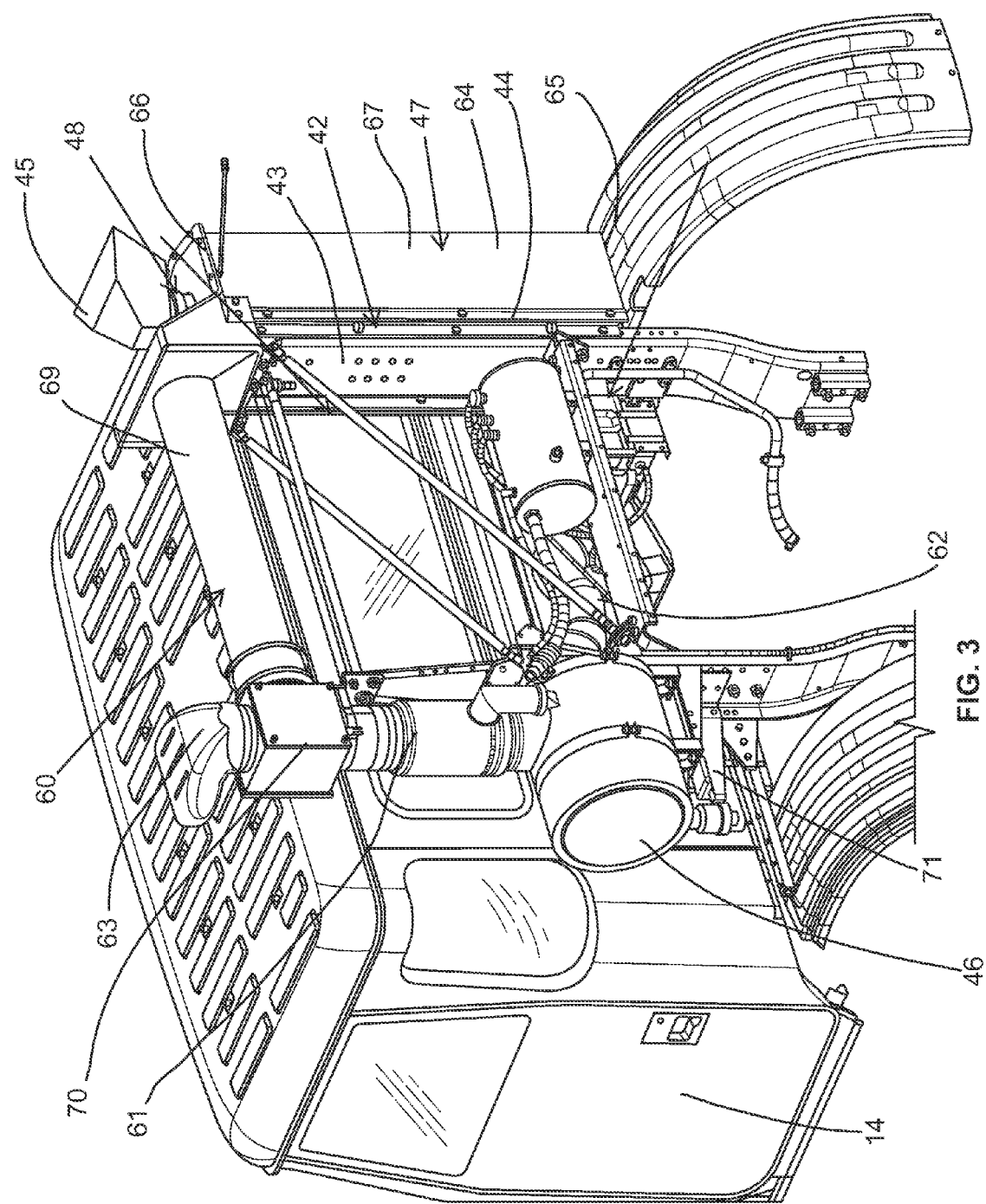
FIG. 3 is a rear perspective view of a portion of a vehicle as shown in FIG. 2, including one embodiment of an air intake assembly according to aspects of the present disclosure.
Figure 4:
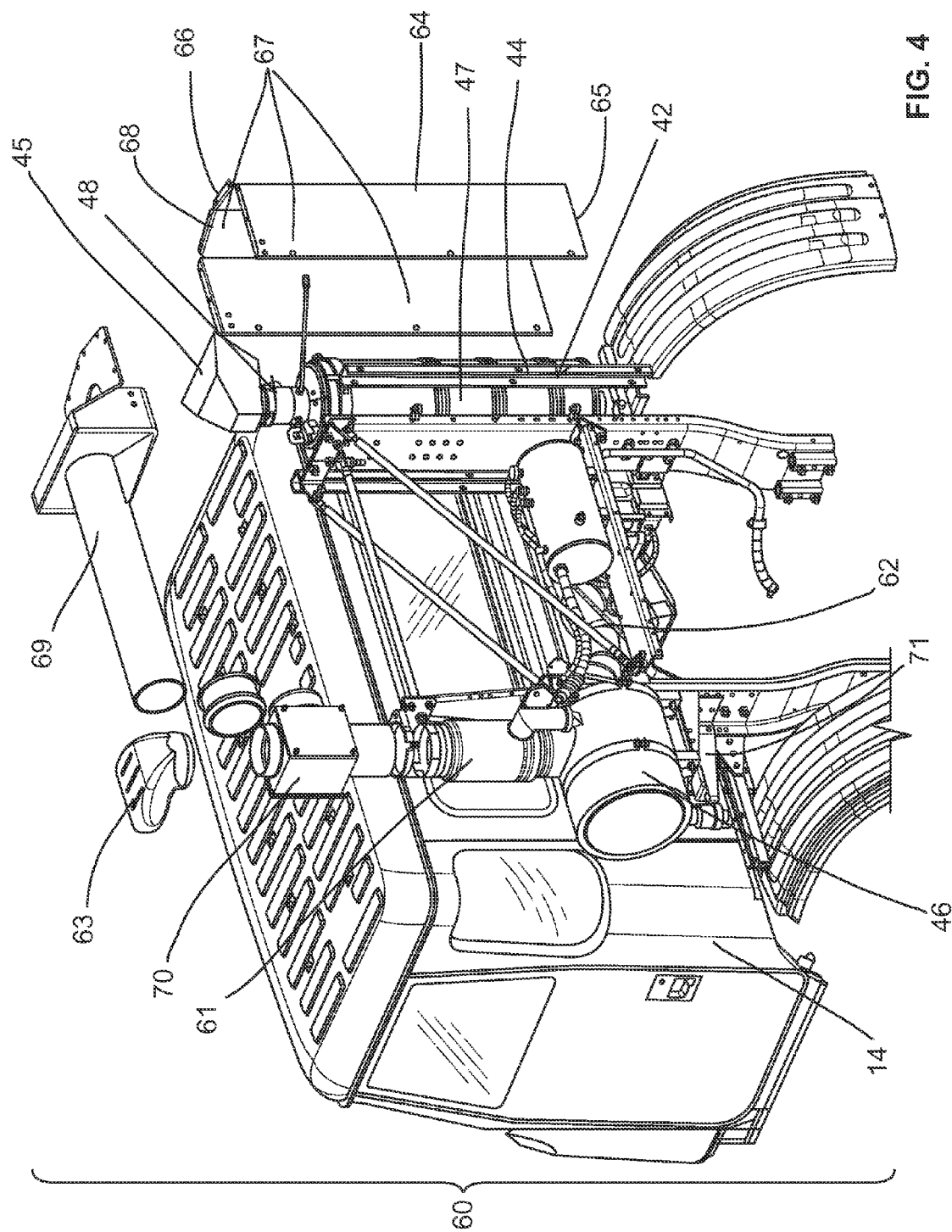
FIG. 4 is a partially exploded rear perspective view of the vehicle and air intake assembly of FIG. 3.
Figure 5:
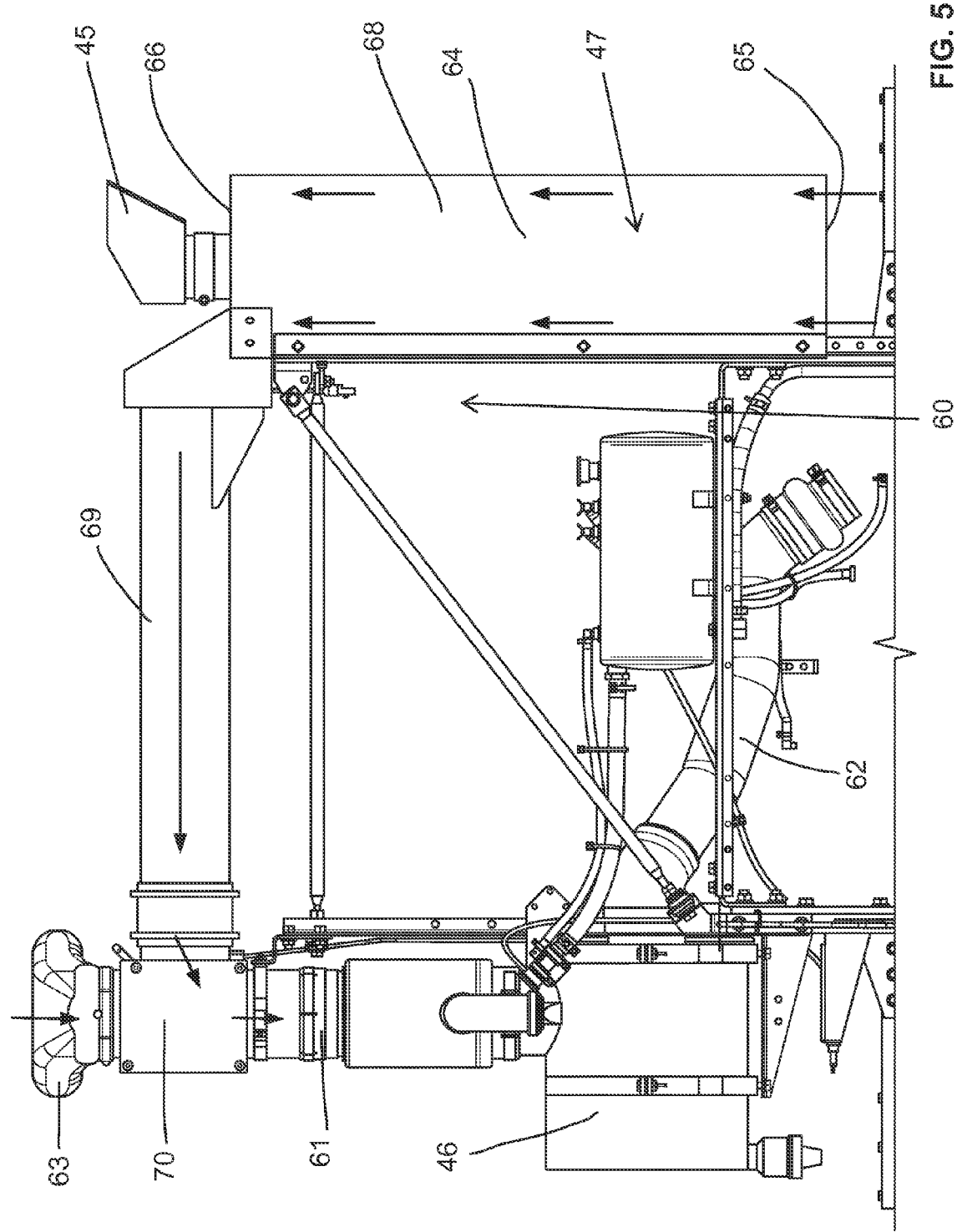
FIG. 5 is a rear view of the air intake assembly of FIG. 4, schematically illustrating air flow paths through the assembly.

One embodiment of an air intake assembly 60 is illustrated in FIGS. 3-5. In this embodiment, the air intake assembly 60 utilizes a heater box 64 that is operably connected to the intake conduit 61 and is configured to heat the air passing through the intake conduit 61 to the air cleaner 46. In other words, the heater box 64 in this embodiment is positioned upstream of the air cleaner 46. The heater box 64 is connected to and/or positioned adjacent to a portion of the exhaust assembly 48 to allow the air to absorb heat from the exhaust assembly 48, thereby supplying heated air to the engine 94. In the embodiment illustrated in FIGS. 3-5, the heater box 64 is positioned around the three way catalyst device 47 of the exhaust assembly 48 and has a bottom end 65 adapted to receive ambient air and/or operate as an air intake and a top end 66 adapted to allow air to exit the heater box 64 and/or operate as an air output. The heater box 64 has a plurality of walls 67 extending between the bottom and top ends 65, 66 and configured to define a chamber 68 around the catalyst device 47 of the exhaust assembly 48. The top end 66 of the heater box 64 is connected to an extraction conduit 69 that connects the heater box 64 to the intake conduit 61 and/or the air cleaner 46. The heater box 64 is illustrated as a rectangular cylindrical component in FIGS. 3-5; however, it is understood that the term "box" should not be inferred to require any specific shape, and the heater box 64 may have any shape that is practical, including various other polygonal or non-polygonal (e.g., circular or elliptical) cylindrical shapes, or a non-cylindrical shape.

In the embodiment of FIGS. 3-5, the air intake assembly 60 further includes a two-way inlet valve box or diverter box 70 that is connected to the extraction conduit 69 and the intake conduit 61 and is configured to control air flow to the air cleaner 46. The valve box 70 can be adjusted to selectively pass or block ambient air from the intake 63 and heated air from the extraction conduit 69. A valve control 71 is connected to the valve box 70 to control its operation. The valve control 71 is a manual control in the embodiment of FIGS. 3-5, such as a lever-actuated push-pull cable assembly or other mechanism for mechanically operating the valve box 70. However, the valve control 71 may additionally or alternately be configured for automated control in other embodiments, such as by connection to the vehicle control system. In one embodiment, the valve box 70 is configured to be adjustable to only pass ambient air from the intake 63 and to block air from the extraction conduit (e.g., in warmer weather) or to only pass heated air from the extraction conduit 69 (e.g., in cold weather) and to block air from the intake 63. In another embodiment, the valve control 71 may be configured for gradual adjustment, to allow mixing of ambient air from the intake 63 and heated air from the extraction conduit 69. Such gradual adjustment is described in greater detail below. The valve box 70 in the embodiment of FIGS. 3-5 is connected to the intake 63 and the extraction conduit 69 outputs to the intake conduit 61 to pass air to air cleaner 46. In another embodiment, the valve box 70 may be positioned immediately adjacent to the air cleaner 46 and may pass air directly to the air cleaner 46. Air exiting the air cleaner 46 is passed to the engine assembly through conduit 62. It is understood that the valve 70 may not be configured as a single box, and that the term "a valve" or "a valve box" may be interpreted to include multiple valves unless restrictive terminology (e.g., "single valve") is used.

In the embodiment of FIGS. 3-5, the air intake assembly 60 functions to heat air by passing the air over the catalyst device 47. As illustrated in FIG. 5, air enters the heater box 64 through an opening in the bottom end 65 and travels upward through the heater box 64. As the air passes through the chamber 68 of the heater box 64 and progressively over surfaces of the catalyst device 47, the air is gradually heated, so that the air at the top end 66 of the heater box 64 has the highest temperature. This heated air is then passed through the extraction conduit 69 through the valve box 70 and into the intake conduit 61, assuming the valve box 70 is adjusted to permit passage of air from the extraction conduit 69. The heated air is then passed through the air cleaner 46 and on to the engine assembly through the second conduit 62.

The vehicle 10 may further include mounting structure 42 for the heater box 64, which may include the mounting structure 43 for the catalyst device 47, as well as additional mounting structure. The mounting structure 42 in the embodiment of FIGS. 3-5 includes adaption channels 44 connected to the catalyst mounting structure 43 for connection to the heater box 64. Fasteners such as screws, bolts, rivets, etc. may be used to connect the heater box 64 and the mounting structure 42 and the extraction pipe 69. Additionally, in the embodiment of FIGS. 3-5, the catalyst mounting structure 43 also combines with the walls 67 to partially define the chamber 68 of the heater box 64, although this configuration may be different in other embodiments.

The embodiment of the air intake assembly 60 in FIGS. 3-5 can advantageously provide heated air to the engine assembly by using heat from the vehicle exhaust assembly 48, which does not require additional energy input for heating the air. Additionally, the heater box 64 and other components of the air intake assembly 60 can be easily installed in a CNG powered vehicle 10 with minimal necessary modifications to the structure, and the heater box 64 and additional parts of the air intake assembly 60 can be easily manufactured. Further, this configuration ensures that air is extracted from the heater box 64 at its highest temperature and is delivered to the air cleaner 46 and the turbocharger 95 in a heated state. Still further, the use of the heater box 64 upstream from the air cleaner 46 assists in defrosting and/or resisting icing of components of the air cleaner 46, such as the dust boot.

Another embodiment of an air intake assembly 60 is illustrated in FIGS. 6-9. In this embodiment, the air intake assembly 60 utilizes a heat exchanger 72 that is positioned downstream from the air cleaner 46 and the turbocharger 95, to heat the air immediately before entering the engine, i.e., between the turbocharger 95 and the engine 94. The heat exchanger 72 is connected to the coolant system of the vehicle 10, in order to draw heat from the coolant system to heat the air passing through. In one embodiment, as illustrated in FIGS. 6-9, the heat exchanger 72 is positioned to bypass the charge air cooler (CAC) 96 so that the air is heated, rather than cooled, prior to entering the inlet manifold 97 of the engine 94. In other embodiment, the air intake assembly 60 may operate by simply bypassing the CAC 96, without the need for the heat exchanger 72. Such an embodiment may have the same configuration as the air intake assembly 60 illustrated in FIGS. 6-9, with the heat exchanger 72 replaced by a continuous conduit that is in parallel with the CAC 96. In a further embodiment, the heat exchanger 72 may be used in line with the CAC 96.

FIGS. 6-9 illustrate parts of the engine assembly of the vehicle 10, along with parts of the air intake assembly 60 of one embodiment. As shown in FIGS. 6-9, a third or turbocharger conduit 73 passes air from the turbocharger 95 (if present) toward the engine 94, and a split joint or Y-joint 74 is provided to split the air path into a fourth or CAC conduit 75 (also referred to as a "cooler conduit") leading from the split joint 74 to the CAC 96 and a fifth or bypass conduit 76 leading from the split joint 74 to the heat exchanger 72. The heat exchanger 72 has an inlet 77 connected to the bypass conduit 76 and an outlet 78 connected to a sixth or engine conduit 53 that leads to the engine inlet manifold 97, to pass heated air from the heat exchanger 72 to the engine 94. As illustrated in FIGS. 6-9, in one embodiment, the heat exchanger 72 may be a shell-and-tube heat exchanger, which may have a multi-pass configuration. The heat exchanger 72 has a coolant inlet 79 and a coolant outlet 80 that are connected to coolant lines 81 of the engine assembly. The coolant has absorbed heat generated by the engine 94, and is therefore delivered to the heat exchanger 72 at elevated temperature (e.g., about 82° C.). The heat exchanger 72 uses this coolant to heat the air passing through. A support bracket 85 or other supporting structure may be provided to support the heat exchanger 72, as illustrated in FIGS. 6-7.

In the embodiment of FIGS. 6-9, both the CAC conduit 75 and the bypass conduit 76 are provided with valves 82 to control the airflow through each conduit. Each valve 82 is adapted to control the airflow through its respective conduit 75, 76 gradually or incrementally, to permit gradual adjustment of the airflow to the engine 94 from 100% air passing through the heat exchanger 72 to 100% air passing through the CAC 96, as well as mixes of both types of air. For example, the valves 82 may be adjusted to provide mixes of 75%/25%, 50%/50%, or 25%/75% of heated air from the heat exchanger 72 vs. air from the CAC conduit 75, as well as potentially a nearly infinite number of other flow ratios. In the embodiment illustrated in FIGS. 6-9, the valves 82 are controlled manually by direct adjustment of the valves 82. In other embodiments, the valves 82 may be controlled automatically, such as by the vehicle control system, and/or the valves 82 may be simple on/off valves, rather than being adapted for gradual adjustment. In a further embodiment, a single valve may be provided at the split joint 74 that can adjust and control air flow through the CAC conduit 75 and the bypass conduit 76. As described above, the term "a valve" may be interpreted to include multiple valves unless restrictive terminology (e.g., "single valve") is used.

Figure 8:
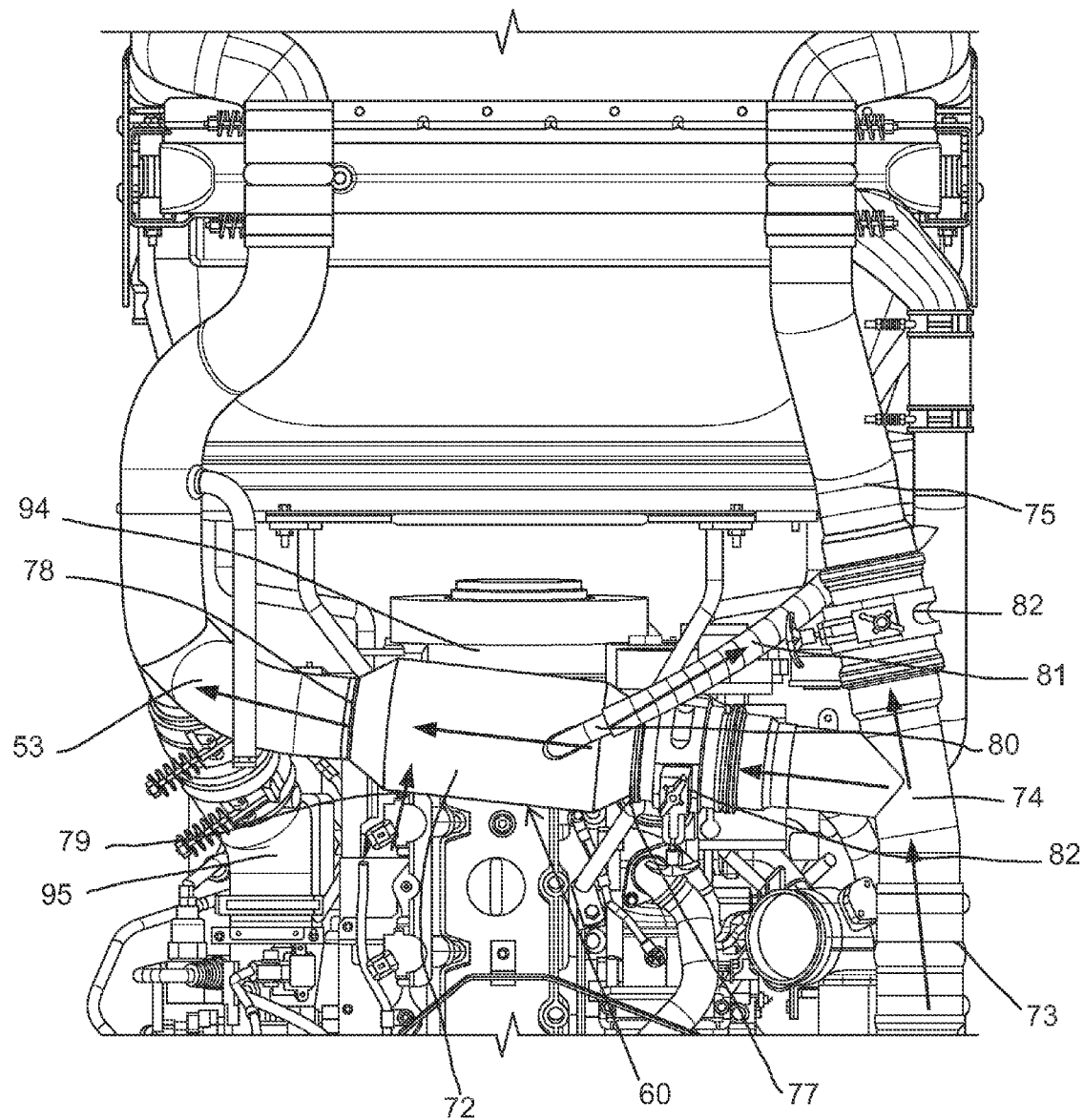
FIG. 8 is a top view of the engine assembly and air intake assembly of FIG. 6, schematically illustrating air flow paths through the assembly.
Figure 9:
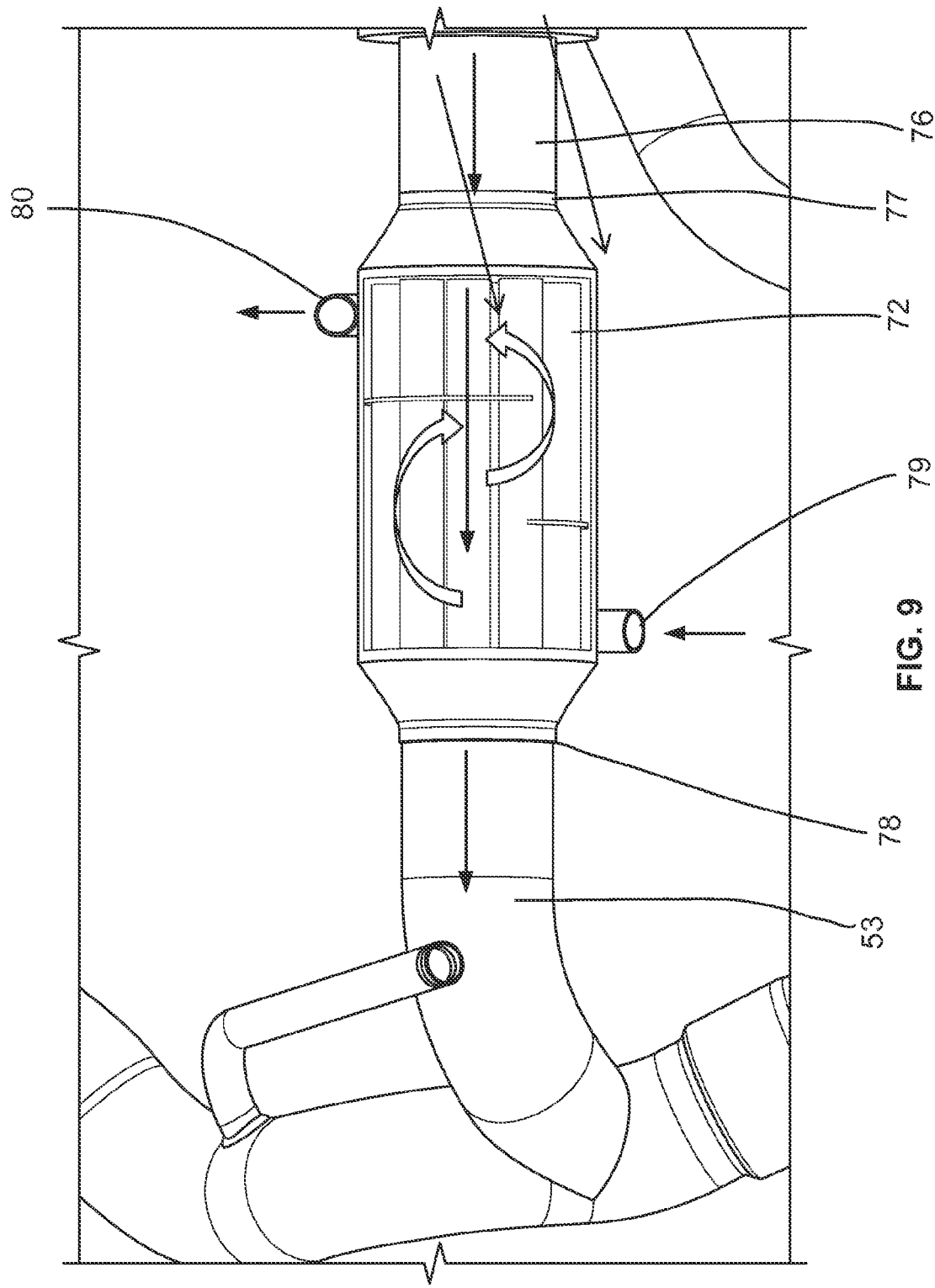
FIG. 9 is a magnified top view of a portion of the air intake assembly of FIG. 6, schematically illustrating air flow paths through the assembly.

In the embodiment of FIGS. 6-9, the air intake assembly 60 functions to heat air by heating the air using the coolant system of the vehicle 10. As illustrated in FIG. 8, air enters the split joint 74 through the third conduit 73 and is then distributed through the CAC conduit 75 and/or the bypass conduit 76 in selected proportions, based on the settings of the valves 82. Air that passes through the heat exchanger 72 is heated by the coolant in the heat exchanger 72 and then passes through the engine conduit 77 to the engine inlet manifold 97 in a heated state. Air that passes through the CAC conduit 75 is directed to the CAC 96 and then on to the engine inlet manifold 97 at substantially lower temperature. The turbocharger 95 (if present) may also add heat to the air, for example, increasing the temperature by about 10° C. The CAC 96, on the other hand, may cool the air, e.g., back to ambient temperature. Thus, the valves 82 can be adjusted to provide air to the engine 94 at a wide variety of desired temperatures by selecting appropriate mixtures of heated air from the heat exchanger 72 and ambient air from the CAC 96.

The embodiment of the air intake assembly 60 in FIGS. 6-9 can advantageously provide heated air to the engine 94 by using heat from the vehicle coolant system, which does not require additional energy input for heating the air. Additionally, the heat exchanger 72 and other components of the air intake assembly 60 can be easily installed in a CNG powered vehicle 10 with minimal necessary modifications to the structure. Further, this configuration permits air to be supplied to the engine 94 at a wide range of selected temperatures. Still further, the heat exchanger 72 is positioned to heat the air after it passes through the air cleaner 46, so that minimal heat is lost before the air reaches the engine 94.

Figure 10:
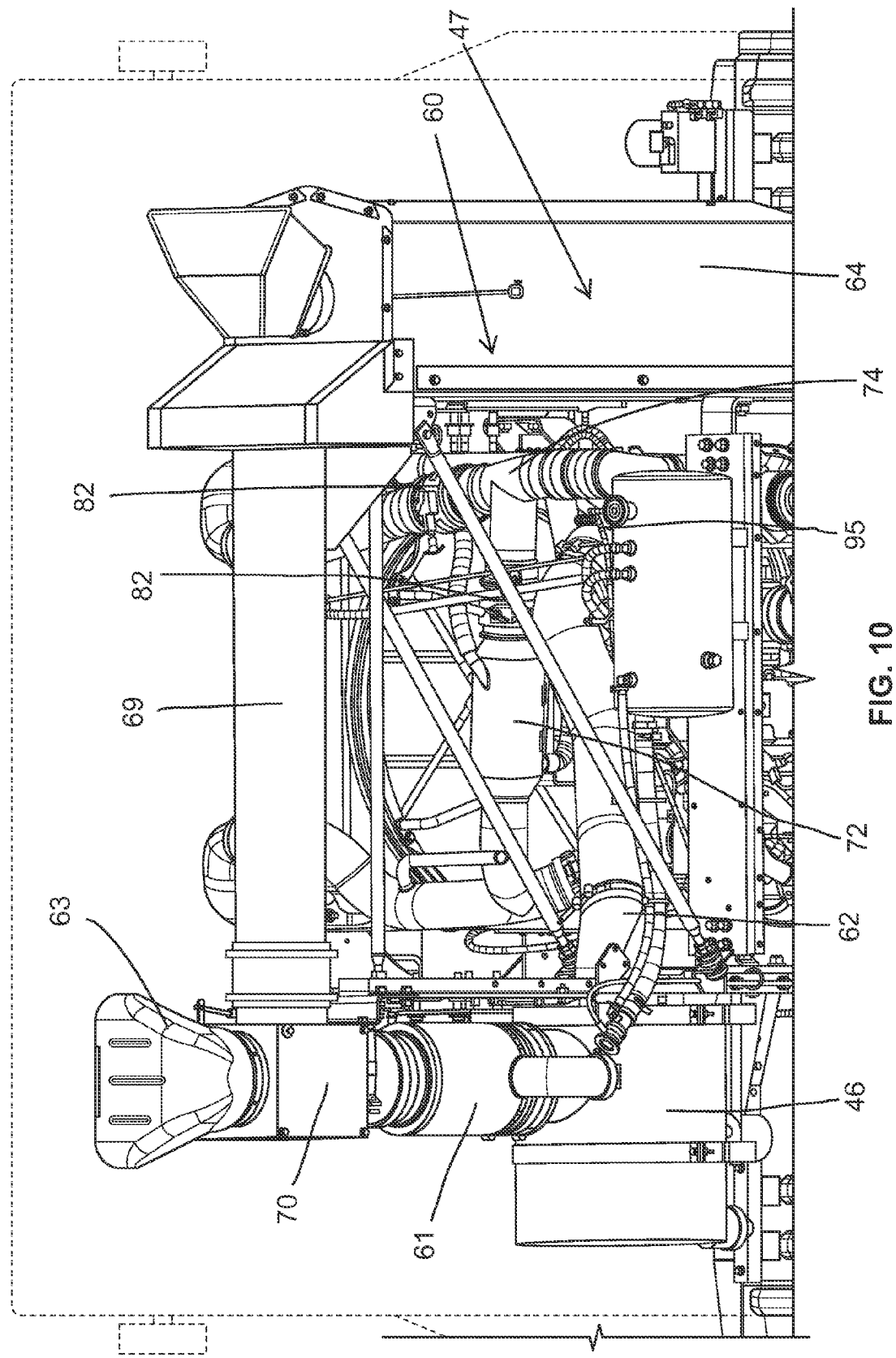
FIG. 10 is a rear elevation view of a portion of a vehicle as shown in FIG. 2, including one embodiment of an air intake assembly according to aspects of the present disclosure, which includes the air intake assembly of FIG. 3 and the air intake assembly of FIG. 6.

FIG. 10 illustrates another embodiment of an air intake assembly 60 that includes both a heater box 64 as illustrated in FIGS. 3-5 and a heat exchanger 72 as illustrated in FIGS. 6-9. It is understood that any of the features, embodiments, and variations described herein with respect to the configurations in FIGS. 3-5 and 6-9 may be used in connection with this embodiment. The configuration illustrated in FIG. 10 provides air to the air cleaner 46 and the turbocharger 95 in a heated state, and also allows for heat to be further added to the air or removed from the air by the heat exchanger 72 and CAC 96 depending on the settings of the valves 82. Thus, this configuration permits air to be supplied to the engine 94 at a higher maximum temperature than either configuration alone, with heat being added by the heater box 64, the turbocharger 95, and the heat exchanger 72. This configuration also permits air to be supplied to the engine 94 at a wider range of temperatures than either configuration alone, with temperatures ranging from the aforementioned maximum temperature to ambient temperature, depending on the settings of the valves 82 and the valve box 70. In a further embodiment, the configurations of FIGS. 3-5 and 6-9 may be used together without the heat exchanger 72, and with the bypass conduit 76 extending straight to the engine inlet manifold 97. This configuration would provide air that is heated by the heater box 64 and the turbocharger 95, and the option to partially or completely bypass the CAC 96 by use of the valves 82 will still allow for selection of a wide range of air temperatures to supply to the engine 94. It is understood that this configuration (without the heat exchanger 72) may be used without the heater box 64 or with the heater box 64 bypassed, which allows air heated by the turbocharger 95 to completely or partially bypass the CAC 96 to avoid cooling of the heated air by the CAC 96.

Figure 11:
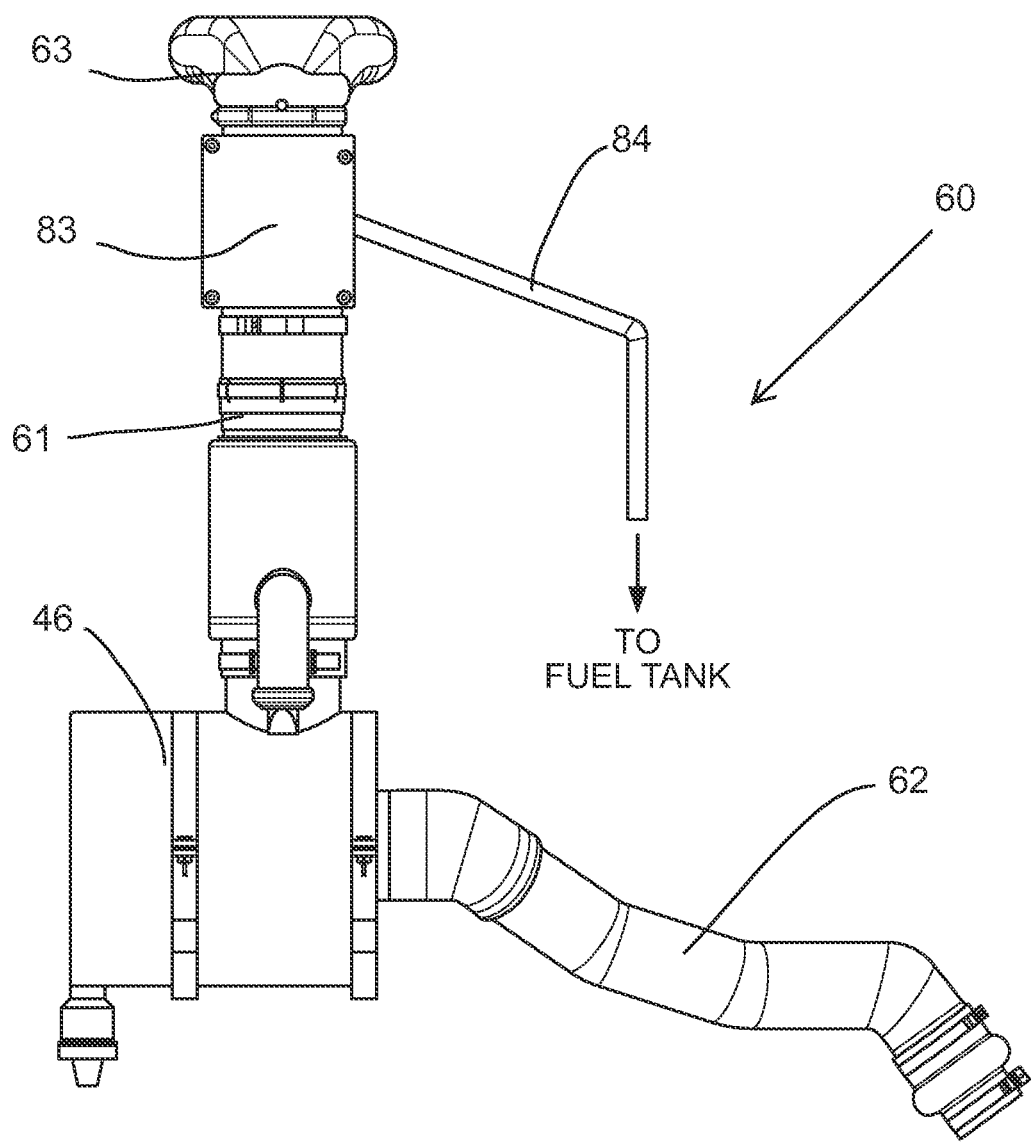
FIG. 11 is a rear view of another embodiment of an air intake assembly according to aspects of the present disclosure.
Figure 12:
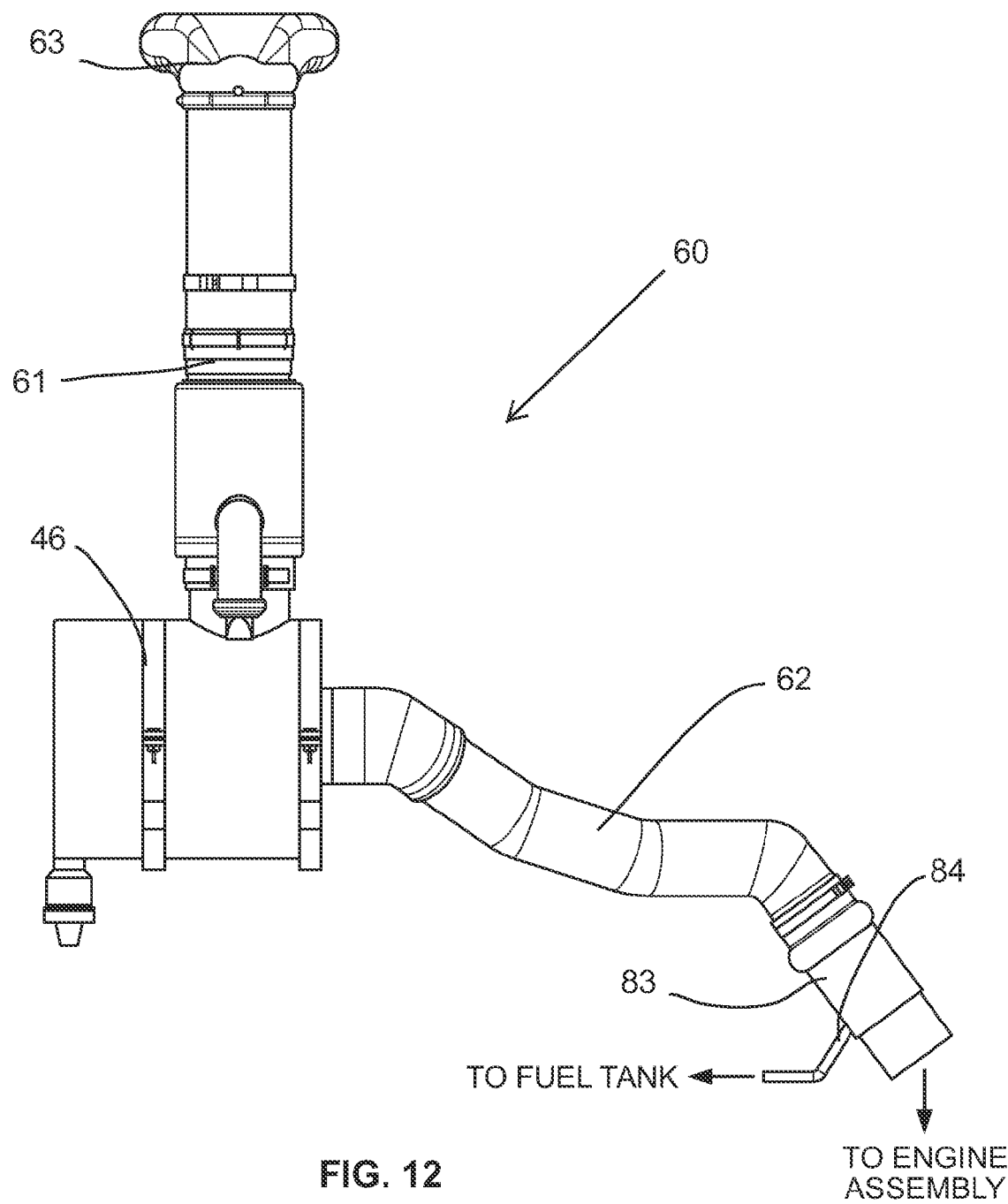
FIG. 12 is a rear view of another embodiment of an air intake assembly according to aspects of the present disclosure.

Additional embodiments of air intake assemblies 60 are illustrated in FIGS. 11-12. In these embodiments, a powered heater 83 is connected along the airflow path to heat the air passing toward the engine 94. Such a heater 83 can potentially heat the air more quickly than the heater box 64 as illustrated in FIGS. 3-5, and can also provide a more compact design. The heater 83 in both of these embodiments is configured as a CNG-powered heater that includes a fuel line 84 connected to the fuel system of the vehicle 10, so that the heater 83 can be powered by the normal fuel supply of the vehicle 10. It is understood that the heater 83 may be configured to use the same fuel as the engine 94, and a different type of engine 94 (e.g., gasoline or diesel) may utilize a different type of heater 83. The heater 83 may alternately be configured to generate heat using a different power source, for example, a fuel powered heater with its own separate fuel supply or an electric heater that is powered by a battery and/or a connection to the electric system of the vehicle 10. In the embodiment of FIG. 11, the heater 83 is positioned upstream of the air cleaner 46 and the engine assembly, and in the embodiment of FIG. 12, the heater 83 is positioned downstream of the air cleaner 46 and upstream of the engine assembly. The configuration of FIG. 12 may be utilized for a heater 83 with lower heating capability, as heat can be lost as the air passes through the air cleaner 46. In the embodiments of FIGS. 11-12, a valve is not necessary, as the heater 83 can be turned on or off to adjust between supplying heated air or cooled air to the engine assembly. However, in another embodiment, the heater 83 may be run in parallel with the existing air intake system 60, and one or more valves may be used accordingly. In a further embodiment, the heater 83 may be used as a supplementary heat source in any of the configurations of FIGS. 3-10.

The heater 83 configurations of FIGS. 11-12 can be used in combination with the configuration illustrated in FIGS. 6-9, with or without the heat exchanger 72, in one embodiment of an air intake assembly 60. This configuration would function similarly to the configuration of FIG. 10 as described herein. In another embodiment, the heater 83 may be used in place of the heat exchanger 72 in the embodiment of FIGS. 6-9. Such a configuration may further be used in combination with the heater box 64 of FIGS. 3-5, as described herein with respect to FIG. 10.

As described above, various features of the air intake assembly 60, such as the valve box 70, the valves 82, and/or the heater 83, may be configured to be automatically controlled, such as by the vehicle control system, in one embodiment. These components, as well as other components, may be in communication with the vehicle control system, so that the components are monitored and/or adjusted by the vehicle control system in order to maintain a specific temperature at one or more points along the air intake assembly 60, e.g., at the intake of the air cleaner 46, at the turbocharger 95, at the engine 94 or inlet manifold 97, etc. Sensors (not shown) in communication with the vehicle control system may be placed in appropriate locations along the air intake assembly 60 to monitor temperatures at those locations. Thermostats or similar components may additionally or alternately be used. It is understood that the vehicle control system may be programmed with appropriate computer-readable instructions to perform these functions. In another embodiment some or all of the monitoring and controlling described herein may be performed by one or more computer devices separate from the vehicle control system.

Any features of any of the embodiments described herein may be utilized in connection with any other features of other embodiments described herein, as desired. Further, the embodiments of the air intake assembly 60 illustrated in FIGS. 3-12 is configured for a CNG powered vehicle 10 with a CNG engine 94. In other embodiments, the air intake assembly 60 may be configured for use with a CNG vehicle 10 having a different configuration or arrangement of components, or may be configured for use with a different type of vehicle (e.g., gasoline or diesel). It is understood that the features of the air intake assembly 60 described herein may be modified to fit the differing components of these differently configured vehicles and engines.

The air intake assemblies described herein provide benefits and advantages over existing designs. For example, the various configurations described and illustrated herein provide the ability to selectively provide heated air to the engine in low temperature applications, or to provide ambient temperature air in more temperate or warm conditions. The ability to provide heated air to the engine assists in avoiding freezing or icing of engine components and other vehicle components, which can impede their function. Several configurations described herein also provide the capability for selectively controlling the temperature of air provided to the engine over a range of temperatures. Many advantages of specific configurations are described herein as well. The benefits and advantages described herein may be particularly useful in connection with CNG engines, although at least some aspects described herein may be useful in connection with different types of engines. Still other benefits and advantages are explicitly or implicitly described herein and/or recognized by those skilled in the art.

While the specific embodiments have been illustrated and described, numerous modifications come to mind without significantly departing from the spirit of the invention, and the scope of protection is only limited by the scope of the accompanying Claims.

What is claimed is:

1. An air intake assembly for a vehicle comprising:
   an air intake configured to intake ambient air, and
   a heater box configured to be positioned adjacent a component of an exhaust assembly of the vehicle, the heater box configured to intake ambient air and heat the ambient air by heat absorption from the component of the exhaust assembly;
   wherein the air intake assembly is configured to selectively permit passage of ambient air from the air intake and heated air from the heater box toward an engine assembly of the vehicle, and
   wherein the component of the exhaust assembly is a catalyst device, and wherein the heater box defines a chamber configured to be disposed around the catalyst device.

2. The air intake assembly of claim 1, wherein the heater box is configured to be positioned such that a portion of the catalyst device is positioned within the chamber to permit heat transfer from the catalyst device to the ambient air within the chamber.

3. The air intake assembly of claim 1, further comprising a valve in communication with the air intake and the heater box and further configured for connection with the engine assembly, the valve configured to selectively permit passage of the ambient air from the air intake and the heated air from the heater box toward the engine assembly.

4. The air intake assembly of claim 3, further comprising an extraction conduit that connects the heater box to the valve.

5. The air intake assembly of claim 3, further comprising a valve control connected to the valve and configured to control operation of the valve.

6. The air intake assembly of claim 5, wherein the valve control is a manually-operated device.

7. The air intake assembly of claim 5, wherein the valve control is a computer-operated device.

8. The air intake assembly of claim 3, further comprising an intake conduit configured for connection to an air cleaner, wherein the valve is positioned between the air intake and the intake conduit.

9. The air intake assembly of claim 3, wherein the valve is configured to allow incremental mixing of the ambient air from the air intake and the heated air from the heater box.

10. The air intake assembly of claim 3, wherein the valve is configured for alternate selection of passing the ambient air from the air intake or passing the heated air from the heater box.

11. The air intake assembly of claim 1, further comprising:
   a cooler conduit configured to be connected with an air cleaner and a charge air cooler of the vehicle, the cooler conduit having a first valve;
   a bypass conduit joined to the cooler conduit and configured to be connected with the air cleaner, the bypass conduit having a second valve and being configured to bypass the charge air cooler;
   a heat exchanger connected to the bypass conduit, the heat exchanger being further configured to be connected to a coolant system of the vehicle, wherein the heat exchanger is configured to heat air passing through by heat absorption from the coolant system; and
   an engine conduit connected to the heat exchanger and configured to pass heated air from the heat exchange to an engine of the engine assembly.

12. The air intake assembly of claim 1, wherein the heater box has a rectangular shape.

13. The air intake assembly of claim 1, wherein the heater box has a bottom end adapted to receive ambient air and a top end adapted to allow air to exit the heater box.

14. A vehicle comprising:
   a chassis supported by a plurality of wheels;
   an engine assembly operably connected to at least one of the wheels and configured to transfer power to the at least one of the wheels;
   an exhaust assembly connected to the engine assembly; and
   an air intake assembly connected to the engine assembly and configured for supplying air to the engine assembly, the air intake assembly comprising:
      an air intake configured to intake ambient air; and
      a heater box positioned adjacent a component of the exhaust assembly, the heater box configured to intake ambient air an heat the ambient air by heat absorption from the component of the exhaust assembly; and
      wherein the air intake assembly is configured to selectively permit passage of ambient air from the air intake and heated air from the heater box toward the engine assembly, and
      wherein the component of he exhaust assembly is a catalyst device, and wherein the heater box defines a chamber disposed around the catalyst device.

15. The vehicle of claim 14, wherein the air intake assembly further comprises a valve in communication with the air intake and the heater box and further in connection with the engine assembly, wherein the valve is adjustable to selectively permit passage of ambient air from the air intake and heated air from the heater box toward the engine assembly.

16. The vehicle of claim 15, further comprising an air cleaner connected to the engine assembly and configured to clean air from the air intake assembly before the air reaches the engine assembly, wherein the air intake assembly further comprises an intake conduit configured for connection to an air cleaner, and wherein the valve is positioned between the air intake and intake conduit.

17. The vehicle of claim 14, wherein the heater box is positioned such that a portion of the catalyst device is positioned within the chamber to permit heat transfer from the catalyst device to the ambient air within the chamber.

18. The vehicle of claim 15, wherein the air intake assembly further comprises an extraction conduit that connects the heater box to the valve.

19. An air intake assembly for a vehicle comprising:
a first air intake configured to intake ambient air;
an intake conduit extending from the first air intake and configured to extend toward an engine assembly of the vehicle;
a heater box configured to be positioned adjacent a catalyst device of an exhaust assembly of the vehicle;
a second air intake configured to intake the ambient air and configured to be positioned adjacent the catalyst device, the second air intake in communication with the heater box, such that the heater box is configured to intake ambient air from the second air intake and heat the ambient air by heat absorption from the exhaust assembly; and
an extraction conduit extending from the heater box to the intake conduit to permit heated air to flow from the heater box into the intake conduit, wherein the extraction conduit is configured to be located downstream from the catalyst device,
wherein the air intake assembly is configured to selectively permit passage of the ambient air from the first air intake and the heated air from the heater box via the extraction conduit through the intake conduit and toward the engine assembly.

20. The air intake assembly of claim 19, further comprising a valve in communication with the first air intake, the intake conduit, and the extraction conduit and further configured for connection with the engine assembly, the valve configured to selectively permit passage of the ambient air from the first air intake and the heated air from the heater box through the intake conduit and toward the engine assembly, wherein the valve is configured to allow incremental mixing of the ambient air from the first air intake and the heated air from the heater box.

21. the air intake assembly of claim 19, wherein the first air intake and the intake conduit are configured to be positioned along a first lateral side of the vehicle, and the second air intake and the heater box are configured to be positioned along a second lateral side of the vehicle opposite the first lateral side, and wherein the extraction conduit extends from the second lateral side to the first lateral side.

22. The air intake assembly of claim 19, wherein the portion of the exhaust assembly is the catalyst device, and wherein the heater box is positioned adjacent the catalyst device.

23. A vehicle comprising:
a chassis supported by a plurality of wheels;
an engine assembly operably connected to at least one of the wheels and configured to transfer power to the at least one of the wheels;
an exhaust assembly connected to the engine assembly; and
an air intake assembly connected to the engine assembly and configured for supplying air to the engine assembly, the air intake assembly comprising:
a first air intake configured to intake ambient air;
an intake conduit extending from the first air intake toward an engine assembly of the vehicle;
a heater box positioned adjacent a catalyst device of an exhaust assembly of the vehicle;
a second air intake configured to intake the ambient air and positioned adjacent the catalyst device, the second air intake in communication with the heater box, such that the heater box is configured to intake ambient air from the second air intake and heat the ambient air by heat absorption from the exhaust assembly; and
an extraction conduit extending from the heater box to the intake conduit to permit heated air to flow from the heater box into the intake conduit, wherein the extraction conduit is located downstream from the catalyst device,
wherein the air intake assembly is configured to selectively permit passage of the ambient air from the first air intake and the heated air from the heater box via the extraction conduit through the intake conduit and toward the engine assembly.

* * * * *